United States Patent
Zhang et al.

(10) Patent No.: US 6,410,489 B1
(45) Date of Patent: Jun. 25, 2002

(54) FOAM-FLUID FOR FRACTURING SUBTERRANEAN FORMATIONS

(75) Inventors: Kewei Zhang; Ron Pierce, both of Calgary; Nicole Deanne Litt, Ft. Saskatchewan; D. V. Satyanarayana Gupta, Calgary, all of (CA)

(73) Assignee: BJ Services Company Canada, Calgary (CA)

( * ) Notice: Subject to any disclaimer, the term of this patent is extended or adjusted under 35 U.S.C. 154(b) by 0 days.

(21) Appl. No.: 09/474,149

(22) Filed: Dec. 29, 1999

(30) Foreign Application Priority Data

Dec. 31, 1998 (CA) .............................................. 2257697

(51) Int. Cl.$^7$ ................................................ C09K 3/00
(52) U.S. Cl. ...................... 507/202; 507/922; 507/240; 507/259
(58) Field of Search ................................ 507/102, 202, 507/240, 259, 922; 516/14; 166/308

(56) References Cited

U.S. PATENT DOCUMENTS

| | | | |
|---|---|---|---|
| 3,361,213 A | 1/1968 | Savins | |
| 3,578,871 A | 5/1971 | Tetsuzo | |
| 3,937,283 A | 2/1976 | Blauer et al. | |
| 4,007,792 A | * 2/1977 | Meister | 507/922 |
| 4,061,580 A | 12/1977 | Jahnke | |
| 4,071,457 A | * 1/1978 | Meister | 166/308 |
| 4,108,782 A | 8/1978 | Thompson | |
| 4,120,356 A | 10/1978 | Meister | |
| 4,148,736 A | 4/1979 | Meister | |
| 4,165,825 A | 8/1979 | Hansen | |
| 4,354,552 A | 10/1982 | Zingg | |
| 4,360,061 A | 11/1982 | Canter et al. | |
| 4,615,825 A | 10/1986 | Teot et al. | |
| RE32,302 E | 12/1986 | Almond et al. | 166/308 |
| 4,695,389 A | 9/1987 | Kubala | |
| 4,725,372 A | 2/1988 | Teot et al. | |
| 4,735,731 A | 4/1988 | Rose et al. | |

(List continued on next page.)

FOREIGN PATENT DOCUMENTS

| | | |
|---|---|---|
| CA | 1180176 | 1/1985 |
| CA | 1185779 | 4/1985 |
| CA | 1266600 | 3/1990 |
| CA | 1298697 | 4/1992 |
| CA | 2148583 | 5/1994 |
| CA | 2217659 | 5/1994 |
| CA | 2309460 | 5/1999 |
| EP | 0130647 | 1/1985 |
| EP | 0189042 | 7/1986 |
| EP | 0474284 | 3/1992 |
| GB | 2 354 541 | 3/2001 |

OTHER PUBLICATIONS

Stewart, B.R. et al., "Use of a Solids–free Viscous Carrying Fluid in Fracturing Applications: An Economic and Productivity Comparison in Shallow Completions," SPE 30114, prepared for presentation at the European Formation Damage Control Conference, The Hague, The Netherlands, May 15–16, 1995.

Brown, J. Ernest et al., "Use of a Viscoelastic Carrier Fluid in Frac–Pack Applications," SPE 31114, presented at the SPE Formation Damage Symposium, Lafayette, LA, Feb. 14–15, 1994.

McLaughlin et al, (1976)—"Aqueous Polymers for Treating Clays in Oil and Gas." Society of Petroleum Engineers 6008.

Nehmer, (1988)—"Vascoelastic Gravel–Pack Carrier Fluid." Society of Petroleum Engineers 17168.

*Primary Examiner*—Philip Tucker
(74) *Attorney, Agent, or Firm*—Bereskin & Parr; Philip C. Mendes da Costa

(57) ABSTRACT

A fracturing fluid for use in fracturing subterranean formations surrounding oil and gas wells comprises water, an anionic surfactant, and a cationic surfactant.

7 Claims, 1 Drawing Sheet

U.S. PATENT DOCUMENTS

| | | |
|---|---|---|
| 4,770,814 A | 9/1988 | Rose et al. |
| 4,796,702 A * | 1/1989 | Scherubel .................... 507/202 |
| 4,880,565 A | 11/1989 | Rose et al. |
| 4,911,241 A | 3/1990 | Willamson et al. |
| 4,975,482 A | 12/1990 | Peiffer |
| 5,036,136 A | 7/1991 | Peiffer |
| 5,093,448 A | 3/1992 | Peiffer |
| 5,101,903 A | 4/1992 | Llave et al. |
| 5,246,072 A * | 9/1993 | Frazier et al. ............... 507/202 |
| 5,462,689 A | 10/1995 | Choy et al. |
| 5,551,516 A | 9/1996 | Norman et al. ............. 166/308 |
| 5,566,760 A | 10/1996 | Harris ........................ 166/308 |
| 5,964,295 A | 10/1999 | Brown et al. |
| 5,979,555 A | 11/1999 | Gadberry et al. |
| 5,979,557 A | 11/1999 | Card et al. |
| 6,035,936 A | 3/2000 | Whalen |
| 6,069,118 A | 5/2000 | Hinkel et al. |
| 6,106,700 A | 8/2000 | Collins et al. |
| 6,140,277 A | 10/2000 | Tibbles et al. |
| 6,172,010 B1 * | 1/2001 | Argillier ..................... 507/202 |
| 6,239,183 B1 | 5/2001 | Farmer et al. |
| 6,258,859 B1 | 7/2001 | Dahayanake et al. |
| 6,283,212 B1 | 9/2001 | Hinkel et al. |

* cited by examiner

FOAM-FLUID FOR FRACTURING SUBTERRANEAN FORMATIONS

FIELD OF THE INVENTION

The present invention relates to the field of fluids for fracturing subterranean formations, such as the formations surrounding oil or gas wells, to increase their permeability, and thereby increase the potential flow of recoverable hydrocarbons therefrom.

BACKGROUND OF THE INVENTION

In order to improve the recovery of hydrocarbons from oil and gas wells, the subterranean formations surrounding such wells can be fractured. That is, fluid can be introduced into the formations through the well bores, under high pressure, to open the pores and cracks in the formations. The fluids preferably are loaded with proppants, which are particles of hard material such as sand, to wedge open cracks or pores in the formation, and thereby permanently increase permeability and hydrocarbon flow. Therefore, the fracturing fluids are preferably of high viscosity, and therefore capable of carrying effective volumes of proppant material.

Preferably, the fracturing fluid is susceptible of viscosity drop, so as to be easily removed from the well after fracturing. The fluid should also be fairly non-toxic to the well. That is, it should not leave residue that will form a cake to clog the well, or that will leave undesisrable traces in the recoverable hydrocarbons that may be expensive to remove.

Fracturing fluids in common use include aqueous gels and hydrocarbon gels, found by the introduction of cross-linkable polymers into an aqueous or hydrocarbon fluid, followed by the catalyzed cross-linking of the polymers, and the subsequent breaking of the gels, for instance by pH adjustment. These types of systems are quite effective, but require extensive well clean up.

It has been proposed, for instance in U.S. Pat. No. 5,551,516, to provide a fracturing fluid with good viscosity and little residue by combining an inorganic salt stabilizer, a surfactant/thickener and an organic salt or alcohol. The fluid may also contain a gas, and thereby be in the form of a foam. The fluid disclosed in U.S. Pat. No. 5,551,516 develops viscosity of between 150 and 200 cp @ 170 sec$^{-1}$ at temperatures of about 40°–50° C., and surfactant loadings of up to about 5%.

Similar results for viscoelastic surfactant fluids utilizing a single surfactant have been reported by Brown et al in "Use of Viscoelastic Carrier Fluid in Frac-Pack Applications, SPE 31114 (1996) and Stewart et al, "Use of Solids-Free Viscous Carrying Fluid in Fracturing Applications: An Economic and Productivity Comparison in Shallow Completions" SPE 30114 (1994).

It is known, moreover, to utilize a surfactant in an aqueous medum as the external phase of a $CO_2$ foam, as shown in U.S. Pat. No. Re 32 302. The surfactant in such a foam may be an alkyl quaternary amine, a betain, a sulfated alkoxylate, or an ethoxylated linear alcohol. A foam using alpha olefin sulfonate as a surfactant, with a polymer such as a guar, is shown in U.S. Pat. No. 5,556,760.

The object of the present invention is to provide a fracturing foam utilizing an anionic surfactant in combination with a cationic surfactant, in water, as an external phase which at total loadings of up to about 6%, but usually less than 1%, surfactant delivers viscosity at 10°–70° C.

The applicant has found that a combination of an anionic surfactant, such as sodium xylene sulfonate, with a cationic surfactant such as N,N,N, trimethyl-1-octadecamonium chloride will form a viscoelastic gel very quickly, and can be mixed batch-wise in advance, or on-the-fly for use as a fracturing fluid. Inorganic salts may be added as stabilizers, but these are not strictly necessary.

At fairly low total surfactant loadings, foams are favorably formed, using, by volume, 50%–96%, or more of $CO_2$.

For instance, a loading of 3 L/m$^3$ of each of a cationic surfactant such as N,N,N, trimethyl-1-octadecamonium chloride and an anionic surfactant such as sodium xylenesulfonate, with no additional foaming agent, yields a gel with 25 cp viscosity at room temperature, and favorable foaming characteristics.

In a broad aspect, then, the present invention relates to a fracturing foam for use in fracturing subterranean formations surrounding oil and gas wells comprising water, an anionic surfactant, and a cationic surfactant, and from 53% to 96% or more of $CO_2$ by volume.

In one embodiment, the cationic surfactant is added to the water in a quantity of from about 2 L/m$^3$ to about 60 L/m$^3$.

In another embodiment, the anionic surfactant is added to the water in quantities of about 2.0 L/m$^3$ to about 30 L/m$^3$.

BRIEF DESCRIPTION OF THE DRAWINGS

The drawing that illustrates the present invention by way of example.

DETAILED DESCRIPTION

Figure 1:
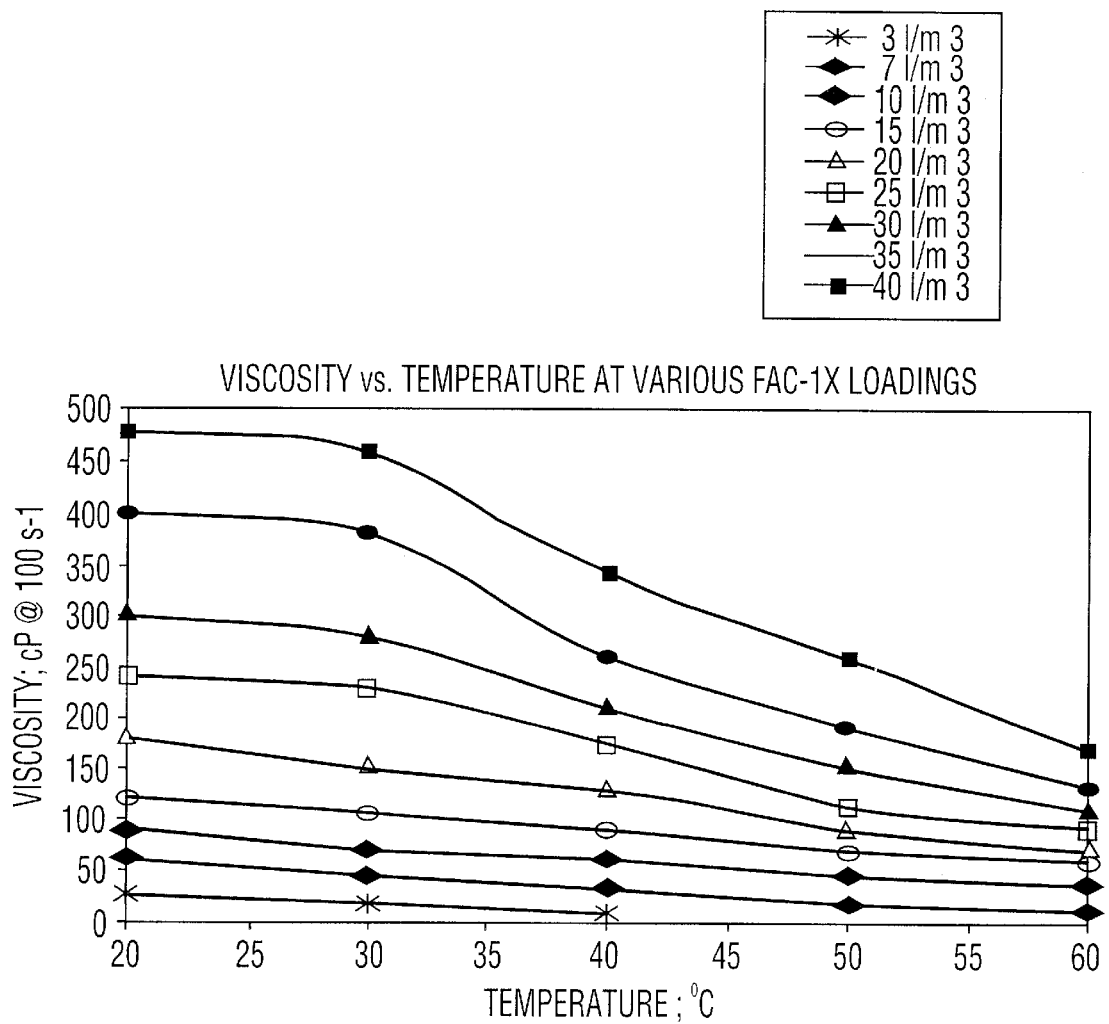
FIG. 1, is a graph of viscosity at combined surfactant concentrations against temperature.

The present invention provides a viscoelastic fracturing foam capable of achieving high viscosity at a wide range of temperature. An anionic surfactant, such as sodium xylene sulfonate is combined with a cationic surfactant, such as N,N,N, trimethyl-1-octadecamonium chloride, in water, in ratios of from about 1:4 to about 4:1 by volume, to obtain a clear viscoelastic gel capable of proppant transport. Other anionic and/or cationic surfactants may be used as will be obvious to one skilled in the art. The gel can be batch-mixed or mixed on-the-fly. The gel exhibits a fairly low surface tension, in the area of about 30 dynes/cm$^2$, which aids in rapid flow-back for cleaning up the well after fracturing. The gel is then mixed with from 53% to 96% or more $CO_2$ to form a foam.

The gel exhibits good foaming characteristics at low loadings of about 3 L/m$^3$ of each of the anionic and cationic surfactants.

Referring to FIG. 1, achieved viscosity of the viscoelastic gel of the present invention is illustrated, at given cationic surfactant (FAC-1X) concentrations. Corresponding anionic surfactant (FAC-2X) concentrations are as set out below in Table 1.

TABLE 1

| FAC-1X L/m$^3$ | FAC-1X % | FAC-2X L/m$^3$ | FAC-2X % |
|---|---|---|---|
| 3.0 | 0.3 | 3.0 | 0.3 |
| 7.0 | 0.7 | 5.5 | 0.55 |
| 10.0 | 1.0 | 8.0 | 0.8 |
| 15.0 | 1.5 | 10.0 | 1.0 |
| 20.0 | 2.0 | 13.0 | 1.3 |
| 25.0 | 2.5 | 14.5 | 1.45 |
| 30.0 | 3.0 | 18.0 | 1.8 |

TABLE 1-continued

| FAC-1X L/m³ | FAC-1X % | FAC-2X L/m³ | FAC-2X % |
|---|---|---|---|
| 35.0 | 3.5 | 20.0 | 2.0 |
| 40.0 | 4.0 | 20.5 | 2.05 |

In each case, the surfactant were mixed with water, and blended together with an overhead blender at low speed. The resulting fluid was placed in a pressured Fann 50 rheometer, where viscosity was measured over a measured range of temperatures.

It will be understood that the data presented in FIG. 1 is exemplary in nature. As can be seen from FIG. 1, however, a wide range of concentrations of anionic and cationic surfactants will result in gels having high viscosities. The gels of lower viscosities have been surprisingly found to foam effective proppant transporting foams with the addition of $CO_2$ in quantities of 53%–96% by volume.

It will be understood that other gases, such as nitrogen, may be freely substituted for $CO_2$ in the present invention.

The aqueous two surfactant fluid of the present invention was tested for foaming capability according to the following procedure:

1. 250 ml $H_2O$ was placed in a blender;
2. anionic surfactant was added (sodium xylene sulfonate);
3. foamer added (if applicable);
4. cationic surfactant added (N,N,N, trimethyl-1-octadecamonium chloride);
5. blender speed increased to maximum of 20 seconds;
6. foam poured onto graduated cylinder, and timer started.

Results are summarized below in Table 2. It will be understood the, that with no additional foamers or stabilizers, a foam according to the present invention, that is stable, will be easily produced. Other acceptable foams are possible with some conventional additives, but are such additional ingredients, with additional expense, are not considered necessary in most cases.

TABLE 2

PUT 250 ML WATER IN BLENDER, ADD FAX-2X, THEN FOAMER IF INCLUDED, THEN THE FAX-1x.
INCREASE THE BLENDER SPEED TO 100% TO PRODUCE FOAM FOR 20 SECONDS.
STOP BLENDER AND POUR FOAM INTO GRAD CYLINDER, START TIMER.

|  | TEST 1 | TEST 2 | TEST 3 | TEST 4 | TEST 5 | TEST 6 |
|---|---|---|---|---|---|---|
| WATER VOLUME | 250 | 250 | 250 | 250 | 250 | 250 |
| GRAD CYLINDER SIZE | 500 | 500 | 1000 | 500 | 1000 | 500 |
| MIX TIME (SEC) | 20 | 20 | 20 | 20 | 20 | 20 |
| FAC-1X 9 (L/m³)[1] | 20 | 20 | 20 | 20 |  | 3 |
| FAC-2X (L/m³)[2] | 13 | 13 |  | 13 |  | 3 |
| WF-1 (L/m³)[3] |  | 5 |  | 1 | 20 |  |
| 97-045XA (L/m³)(COCO)[4] |  |  |  |  |  |  |
| WG-15 (kg/m³)[5] |  |  |  |  |  |  |
| FOAMHEIGHT (ML) | 450 | 575–600 | 1100 | 380 | 1150 | 500 |
| HALF LIFE (MIN) | FOREVER | 1.5–2 | 6 MIN 9 SEC | RIGHT AWAY | 4 MIN | 10 MIN-25 ML SEP |
| COMMENTS | XL | BROKE NOT GOOD | FOAMED GOOD | BROKE NOT GOOD |  |  |

|  | TEST 7 | TEST 8 | TEST 9 | TEST 10 | TEST 11 | TEST 12 |
|---|---|---|---|---|---|---|
| WATER VOLUME | 250 | 250 | 250 | 250 | 250 | 250 |
| GRAD CYLINDER SIZE | 1000 | 1000 | 1000 | 1000 | 1000 | 1000 |
| MIX TIME (SEC) | 20 | 20 | 20 | 20 | 20 | 20 |
| FAC-1X 9 (L/m³) | 7 |  |  |  | 3 | 7 |
| FAC-2X (L/m³) | 5.5 |  |  |  | 3 | 5.5 |
| WF-1 (L/m³) |  | 10 |  |  |  |  |
| 97-045XA (L/m³)(COCO) |  |  | 5 | 10 | 5 | 5 |
| wg-15 (kg/m3) |  | 3 | 3 | 3 |  |  |
| FOAM HEIGHT (ML) | 560 | 900 | 600 | 800 | 780 | 720 |
| HALF LIFE (MIN) | 10 MIN-0 SEP | 10 MIN | 10 MIN-20 ML SEP | 10 MIN-10 ML SEP | 11.5 MIN-125 ML | 10 MIN-0 SEP |
| COMMENTS | XL | GOOD |  |  |  | XL |

[1] n, n-trimethyl-1-octadecamonium chloride
[2] sodium xylenesulfonate
[3] ammonium salt of linear alcohol ethoxysulfate in alcohol
[4] coco-betaine
[5] guar polymer It will be understood then, that with no additional foamers or stabilizers, a foam according to the present invention that is stable will be easily produced. Other acceptable foams are possible with some conventional additives, but are such additional ingredients, with additional expense, are not considered necessary in most cases.

We claim:
1. A foam fracturing fluid for use in fracturing subterranean formations surrounding oil and gas wells comprising water, an anionic surfactant, cationic surfactant, and a gaseous foaming agent, wherein the ratio of said anionic surfactant to said cationic surfactant is in the range from about 1:1 to about 1:1.95, by volume, and wherein at total loadings of surfactant of up to about 6% by volume, said fluid delivers viscosity suitable for use as a fracturing fluid at 10°–70° C.

2. A fluid as claimed in claim 1, wherein said anionic surfactant is sodium xylenesulfonate.

3. A fluid as claimed in claim 2, wherein said cationic surfactant is N,N,N, trimethyl-1-octadecamonium chloride.

4. A fluid as claimed in claim 3, wherein said cationic surfactant is added to said water in a quantity of from about 2 L/m$^3$ to about 60 L/m$^3$.

5. A fluid as claimed in claim 2, wherein said anionic surfactant is added to said water in quantities of about 2.0 L/m$^3$ to about 30 L/m$^3$.

6. A fluid as claimed in claim 1, further including an inorganic salt.

7. A fluid as claimed in claim 1, wherein said foaming agent is $CO_2$, said foaming agent being present in a quantity, by volume of 53% to in excess of 96%.

* * * * *